United States Patent
Deng et al.

(10) Patent No.: US 6,239,243 B1
(45) Date of Patent: May 29, 2001

(54) METHOD FOR PREPARING HYDROPHILIC SILICA GELS WITH HIGH PORE VOLUME

(75) Inventors: Qin Deng; James Richard Hahn; Kiersten Lynn Shephard, all of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/329,384

(22) Filed: Jun. 10, 1999

(51) Int. Cl.[7] ................. C01B 33/14; C08G 77/06; C08K 9/06; B05D 3/02
(52) U.S. Cl. .................. 528/12; 528/10; 528/31; 528/38; 525/477; 525/478; 524/492; 524/493; 523/212; 523/216; 523/307; 428/405; 427/387; 427/397.7; 423/338; 106/315.2; 106/490
(58) Field of Search .................. 106/315.2, 490; 427/387, 397.7; 428/405; 523/212, 216, 307; 524/492, 493; 525/477, 478; 528/10, 12, 31, 38; 423/338

(56) References Cited

U.S. PATENT DOCUMENTS

| | | | |
|---|---|---|---|
| 3,015,645 | 1/1962 | Tyler | 260/46.5 |
| 3,024,126 | 3/1962 | Brown | 106/308 |
| 3,122,520 | 2/1964 | Lentz | 260/46.5 |
| 3,979,546 | 9/1976 | Lewis | 428/394 |
| 4,694,092 * | 9/1987 | Takahata et al. | 556/400 |
| 5,565,142 | 10/1996 | Deshpande et al. | 252/315.2 |
| 5,647,962 | 7/1997 | Jansen et al. | 203/57 |
| 5,708,069 | 1/1998 | Burns et al. | 524/403 |
| 5,789,495 | 8/1998 | Burns et al. | 525/477 |
| 5,789,514 | 8/1998 | Burns et al. | 528/12 |
| 5,795,556 | 8/1998 | Jansen et al. | 423/338 |
| 5,807,501 | 9/1998 | Burns et al. | 252/315.2 |
| 6,005,012 * | 12/1999 | Hrubesh et al. | 521/53 |

FOREIGN PATENT DOCUMENTS

| | | |
|---|---|---|
| 228 090 | 7/1987 | (JP) . |
| WO 92/20623 | 11/1992 | (NO) . |
| WO 98/37016 | 8/1998 | (US) . |
| WO 98/37019 | 8/1998 | (US) . |

OTHER PUBLICATIONS

Materials Chemistry and Physics, "Preparation and Characterization of Hydrophobic Silica Aerogels," Apr. 1998, Elsevier, Switzerland, vol. 53, No. 1, pp. 13–18.
Journal of Non–Crystalline Solids, "Stability of Hydroxyl and Methoxy Surface Groups on Silica Aerogels," North–Holland Physics Publishing. Amsterdam, vol. 212, No. 2–3, Jun. 1 1997, pp. 243–249.
Chemicals Abstracts Service, Columbus, Ohio, "Studies on the surface Properties After Pyrolysis of the Surface–Treated Silica Gels with Various Kinds of Alcohols," 1980, 27(3), 88–94. Abstract only.
Patent Abstracts of Japan, "Production of silica Aerogel," vol. 1996, No. 12, Dec. 26, 1996. Abstract only.
Physics and Chemistry of Glasses, "Crack Speed in Ultraporous Brittle Amorphous Material," Apr. 2000., vol. 41, No. 2, pp. 104–106.
Chemical Abstracts Service, Columbus, Ohio, "Surface Modification of silica Aerogels," 1996, 33(12), 1319–1324. Abstract only.
Journal of Thermal Analysis and Calorimetry, "Calcination of Si02–Aerogel in Oxidizing Atmosphere," vol. 55, No. 3, Mar. 18, 1999, pp. 773–777.
Schwertfeger et al., Chem. Mater. "Generation of Carbonaceous Structures in Silica Aerogel," 1995, 7, 1909–1914.
Brunauer et al., Jour. Am. Chem. Soc., "Adsorption of Gases in Multimolecular Layers," 1938, 60:309.

* cited by examiner

*Primary Examiner*—Robert Dawson
*Assistant Examiner*—Jeffrey B. Robertson
(74) *Attorney, Agent, or Firm*—William F. Boley; Jennifer S. Warren

(57) ABSTRACT

A method for the preparation of hydrophilic silica gels with high pore volume. In the preferred method a hydrophilic silica hydrogel treated with an organosilicon compound to effect hydrophobing of the silica hydrogel is heated in the presence of an oxidizing atmosphere to a temperature sufficient to reduce the hydrophobicity imparted by the surface treatment thereby producing a hydrophilic silica gel having high pore volume.

27 Claims, No Drawings

METHOD FOR PREPARING HYDROPHILIC SILICA GELS WITH HIGH PORE VOLUME

BACKGROUND OF INVENTION

The present invention is a method for the preparation of hydrophilic silica gels with high pore volume. In the method a hydrophilic silica hydrogel is treated with an organosilicon compound in the presence of a catalytic amount of a strong acid to effect hydrophobing of the silica hydrogel. Then, the hydrophobic silica gel is heated in the presence of an oxidizing atmosphere to a temperature sufficient to reduce the hydrophobicity imparted by the surface treatment thereby producing a more hydrophilic silica gel having high pore volume.

Silica gels are typically prepared by wet processes where, for example, a sodium silicate is gelled either under acidic or neutral conditions resulting in a three-dimensional network which partially collapses upon drying unless special precautions are taken to reduce or prevent such collapse. By definition gels from which the liquid medium has been removed with the structure being compressed and the porosity reduced at least to some degree by the surface tension forces as the liquid is removed are referred to as xerogels. Typically such xerogels have surface areas within the range of 50 to 600 $m^2/g$ and pore volumes within a range of about 0.5 to 1 ml/g. In order to obtain silica gels having higher porosity, typically referred to as aerogels, it is generally necessary to convert the hydrogel to an organogel such as an alcogel and then heat the organogel in an autoclave to above the critical point of the liquid so that there is no liquid vapor interface, releasing the vapor, and thereby avoiding collapse or change in structure. Although this method for producing aerogels can produce silica aerogels having surface area and porosity greater than that typically associated with xerogels, it is a costly method and therefore has limited utility.

The present invention provides a convenient method whereby a hydrophilic silica gel having high porosity can be formed without resorting to procedures such as that described above for making aerogels.

Brown, U.S. Pat. No. 3,024,126, teaches a method for making a pre-formed reinforcing silica filler hydrophobic by treating it in an organic solvent with an organosilicon compound, such as an organosilane or low-molecular weight organosiloxane containing 0.1 to 2 total hydroxyl and/or alkoxy radicals per silicon atom, and a small amount of amine, quaternary ammonium, or organometallic compound.

Lewis, U.S. Pat. No. 3,979,546, teaches a method for making the surface of reinforcing silica fillers hydrophobic through the use of alpha-alkoxy-omega-siloxanols with alcohols under mild conditions. The fillers taught are pre-formed solids.

Tyler, U.S. Pat. No. 3,015,645, teaches the making of hydrophobic silica powders by reacting an organosilicon compound such as dimethyldichlorosilane or trimethylmethoxysilane with an silica organogel in the presence of an acidic catalyst and then removing the volatile materials. The method requires the preparation of a silica hydrogel which is converted to an organogel by replacing the water in the silica hydrogel with an organic solvent.

Lentz, U.S. Pat. No. 3,122,520, teaches a procedure where an acidic silica hydrosol is first heated to develop a reinforcing silica structure and then mixed with an organosilicon compound, an acid catalyst, and a water-immiscible organic solvent to produce a hydrophobic silica filler.

Burns et al., U.S. Pat. No. 5,708,069, describe a method for preparing hydrophobic silica gels under neutral conditions. The method comprises two steps, where in the first step the pH of a silica hydrosol is adjusted with a base to within a range of about pH 3 to pH 7 to facilitate formation of a silica hydrogel. In the second step the silica hydrogel is contacted with an organosilicon compound in the presence of a catalytic amount of a strong acid to effect hydrophobing of the silica hydrogel. In a preferred method, in a third step the hydrophobic silica gel is contacted with a sufficient quantity of a water-immiscible organic solvent to convert the hydrophobic silica hydrogel into a hydrophobic silica organogel.

Burns et al., U.S. Pat. No. 5,789,514, describe a method for preparation of hydrophobic silica gels under acidic conditions. The method comprises two steps, where in the first step a silica hydrosol is contacted with a sufficient concentration of a strong mineral acid at a pH less than about pH 1 to form a silica hydrogel. In the second step the silica hydrogel is contacted with described organosilicon compounds in the presence of a catalytic amount of a strong acid to effect hydrophobing of the silica hydrogel thereby forming a hydrophobic silica hydrogel. In a preferred method the hydrophobic silica hydrogel is contacted with a sufficient quantity of a water-immiscible organic solvent to convert the hydrophobic silica hydrogel into a hydrophobic silica organogel.

Burns et al., U.S. Pat. No. 5,789,495 describe a method for making organosilicate-modified silica gels at a pH within a range of about pH 3 to pH 7. The method comprises two steps, where in the first step the pH of an organosilicate-modified silica hydrosol is adjusted with a base to within a range of about pH 3 to pH 7 to facilitate formation of an organosilicate modified silica hydrogel. In the second step the organosilicate-modified silica hydrogel is contacted with an organosilicon compound in the presence of a catalytic amount of a strong acid to effect hydrophobing of the organosilicate-modified silica hydrogel to form a hydrophobic organosilicate-modified silica hydrogel.

Burns et al., U.S. Pat. No. 5,807,501, describe a method for making neutral-aged hydrophobic organosilicate-modified silica gels. The method comprises three steps, where in the first step an organosilicate-modified silica hydrosol is contacted with a strong mineral acid at a pH less than about 1 to form an organosilicate-modified silica hydrogel. In the second step the organosilicate-modified silica hydrogel is aged at a pH within a range of about pH 3.5 to pH 8. In the third step the neutral-aged organosilicate-modified silica hydrogel is contacted with an organosilicon compound in the presence of a catalytic amount of a strong acid to effect hydrophobing of the organosilicate-modified silica hydrogel to form a hydrophobic organosilicate-modified silica hydrogel.

Jansen et al., U.S. Pat. No. 5,795,556, describe a process for preparation of xerogels involving acidifying an aqueous waterglass solution, polycondensing the resulting silica by addition of a base, removing the water from the gel, reacting the gel with a silylation agent, and drying the gel.

Jansen et al., U.S. Pat. No. 5,647,962, describe a method for preparing xerogels involving acidifying an aqueous waterglass solution, polycondensing the silicic acid produced by adding a base to form a gel, removing the water from the gel by extractive distillation with an organic solvent, reacting the gel with a silylation agent, and drying the gel.

Schwertfeger et al., Chem. Mater. 1995, 7, 1909–1914, describe the pyrolysis of organically substituted aerogels in a standing atmosphere of argon resulting in the formation of carbonaceous structures covering the inner surface of the aerogels.

The present invention is a method for the preparation of hydrophilic silica gels having high pore volume. Such hydrophilic silica gels are useful in any of those applications for which high surface area and high pore volume silica are typically used and particularly, for example, as rheology control agents in silicone and organic fluids and silicone rubber compositions such as sealants.

SUMMARY OF INVENTION

The present invention is a method for making a hydrophilic silica hydrogel having high porosity. The method comprises heating a hydrophobic silica gel having organic substituents bonded thereto in an oxidizing atmosphere at a temperature sufficient to reduce the hydrophobicity of the hydrophobic silica gel thereby forming a hydrophilic silica gel.

DESCRIPTION OF INVENTION

The present invention is a method for preparing a hydrophilic silica gel having high pore volume. The method comprises: (A) contacting a silica hydrogel with (1) a catalytic amount of a strong acid and (2) an organosilicon compound selected from the group consisting of organosilanes described by formula $$R^1_a H_b SiX_{4-a-b}, \qquad (1)$$

organosiloxanes described by formula $$R^1_n SiO_{(4-n)/2}, \qquad (2)$$

and organodisilazanes described by formula $$(R^1_3 Si)_2 NH, \qquad (3)$$

where each $R^1$ is independently selected from a group consisting of hydrocarbon radicals comprising 1 to about 12 carbon atoms and organofunctional hydrocarbon radicals comprising 1 to about 12 carbon atoms, each X is independently selected from a group consisting of halogen and alkoxy radicals comprising 1 to about 12 carbon atoms, a=0, 1, 2, or 3, b=0 or 1, a+b=1, 2, or 3 with the proviso that when b=1 then a+b=2 or 3 and n is an integer of from 2 to 3 inclusive thereby forming a hydrophobic silica gel and (B) heating the hydrophobic silica gel in an oxidizing atmosphere at a temperature sufficient to reduce the hydrophobicity of the hydrophobic silica hydrogel thereby forming a hydrophilic silica gel.

The method of preparing the silica hydrogels is not critical to the present invention and can be any of those methods known in the art. The silica hydrogels useful in the present method can be prepared by methods such as those described, for example, in Lentz, U.S. Pat. No. 3,122,520; Burns et al., U.S. Pat. No. 5,708,069; Burns et al. U.S. Pat. No. 5,789,514; Jansen et al., U.S. Pat. No. 5,647,962; and Jansen et al., U.S. Pat. No. 5,795,556, and include organosilicate modified silica hydrogels such as described in Burns et al., U.S. Pat. No. 5,789,495 and Burns et al., U.S. Pat. No. 5,807,501; all of which are incorporated herein by reference for such teachings.

The silica hydrogel useful in the present method may be prepared by first forming a silica hydrosol comprising from about 0.02 g to 0.5 g of $SiO_2$ per ml and if desired about 1 to 50 weight percent of an organosilicate, such as sodium methyl silicate, based on the weight of the hydrosol. The method used to prepare the silica hydrosol is not critical and can be any of those known in the art. The silica hydrosol may be prepared, for example, by deionizing sodium silicate by a method such as the use of an ion exchange resin. Alternatively, the silica hydrosol may be prepared by hydrolyzing a silane at a low temperature. Generally, it is preferred that the silica hydrosol be prepared by deionizing sodium silicate.

The silica hydrogel may be formed from the silica hydrosol under acid or neutral conditions, that is within a pH range of about pH 0 to about pH 7. If the silica hydrogel is to be formed under acid conditions a strong mineral acid can be added to the silica hydrosol to effect formation of a silica hydrogel. Any strong mineral acid can be used. As used herein, the term "strong mineral acid" refers to those acids which ionize to the extent of at least 25 percent in 0.1 N aqueous solution at 18° C. The strong mineral acid may be, for example, hydrochloric, hydroiodic, sulfuric, nitric, and phosphoric acid. If the silica hydrogel is to be formed under neutral conditions a base may be added to the silica hydrosol to effect formation of a silica hydrogel. The base can be, for example, NaOH, KOH, and $Na_2(SiO_2)_{3.36}$.

The temperature at which the silica hydrogel is formed can be within a range of about 20° C. to 250° C., with a range of about 75° C. to 150° C. being preferred, and a range of about 90° C. to 110° C. being most preferred.

The time required for the silica hydrogel to form varies with the temperature and pH of the silica hydrosol, with the time required for the silica hydrogel to form decreasing as the pH approaches the limits of the described pH range. It is preferred that the silica hydrosol and resulting hydrogel be heated at a temperature and length of time such that the resulting silica hydrogel has a structure such that the product after the hydrophobing step has a surface area in the dry state within a range of about 100 $m^2/g$ to 1000 $m^2/g$ as determined by the Brunauer Emmett and Teller (BET) method described in the *Jour. Am. Chem. Soc.* 60:309 (1938) and as further described in Lentz, U. S. Pat. No. 3,122,520 which is hereby incorporated by reference for such a teaching. Generally, the surface area of the silica hydrogel is reduced by the hydrophobing reaction, since the organosilyl groups which become attached to the surface of the silica hydrogel increase the average particle size. The surface of the silica hydrogel can be above 1000 $m^2/g$ provided that the hydrophobing treatment brings it within a range of about 100 $m^2/g$ to 1000 $m^2/g$.

Prior to use in the present method the silica hydrogel may be aged by heating for a period of time at a temperature within a range of about 20° C. to 250° C. If the silica hydrogel is aged, a temperature of about 75° C. to 150° C. is preferred. The length of time for such aging can be within a range of from about 5 minutes up to about 24 hours or longer. Generally, it is preferred that such aging be for a period of time within a range of about 30 minutes to 20 hours.

In step (A) of the present method a silica hydrogel is contacted with one or more of the organosilicon compounds described by above formulas (1), (2), and (3) in the presence of a catalytic amount of a strong acid. In step (A) the strong acid can be the same acid used in preparing the silica hydrogel, if prepared under acid conditions. However, if desired, the silica hydrogel can be washed free of acid and a catalytic amount of strong acid added either prior to, simultaneously with, or subsequent to the addition of the organosilicon compound. In the case where the organosilicon compound is, for example, a chlorosilane, the catalytic amount of the strong acid can be generated in situ by hydrolysis of the chlorosilane or the reaction of the chlorosilane directly with hydroxyls of the silica hydrogel. In step (A), a "catalytic amount of a strong acid" is any amount sufficient to effect reaction of the organosilicon compound with the silica hydrogel. Examples of useful acids include hydrochloric, sulfuric, and benzene sulfonic. It is preferred that in step (A) the strong acid catalyst provide a pH less than about 2.5.

The temperature at which the hydrophobing of step (A) is conducted is not critical and can be from about 20° C. to 250° C. Generally it is preferred that the hydrophobing of step (A) be conducted at a temperature within a range of about 30° C. to 150° C. The hydrophobing of step (A) can be conducted at the reflux temperature of the water-immiscible organic solvent when present.

In step (A) the silica hydrogel is reacted with an organosilicon compound described by formulas (1), (2), and (3). In formulas (1), (2), and (3), each $R^1$ can be independently selected from the group consisting of hydrocarbon radicals comprising 1 to about 12 carbon atoms and organofunctional hydrocarbon radicals comprising 1 to about 12 carbon atoms. $R^1$ can be a saturated or unsaturated hydrocarbon radical. $R^1$ can be a substituted or non-substituted hydrocarbon radical. $R^1$ can be, for example, alkyl radicals such as methyl, ethyl, propyl, tert-butyl, hexyl, heptyl, octyl, decyl, and dodecyl; alkenyl radicals such as vinyl, allyl, and hexenyl; substituted alkyl radicals such as chloromethyl, 3,3,3-trifluoropropyl, and 6-chlorohexyl; and aryl radicals such as phenyl, naphthyl, and tolyl. $R^1$ can be an organofunctional hydrocarbon radical comprising 1 to a about 12 carbon atoms where, for example, the functionality is mercapto, disulfide, polysulfide, amino, carboxylic acid, carbinol, ester, or amido. Preferred is when $R^1$ is an alkyl radical, with methyl being most preferred.

In formula (1) each X is independently selected from the group consisting of halogen and alkoxy radicals comprising 1 to about 12 carbon atoms. When X is a halogen, it is preferred that the halogen be chlorine. When X is an alkoxy radical, X may be, for example, methoxy, ethoxy, and propoxy. Preferred is when X is chlorine atoms.

The viscosity of the organosiloxanes described by formula (2) is not limiting and can range from that of a fluid to a gum. Generally, higher molecular weight organosiloxanes will be cleaved by the acidic conditions of the present method allowing them to react with the silica hydrogel.

The organosilicon compound may be provided to the present method as a single compound as described by formulas (1), (2), and (3) or as a mixture of two or more organosilicon compounds described by these formulas.

Examples of useful organosilicon compounds include diethyldichlorosilane, allylmethyldichlorosilane, methylphenyldichlorosilane, phenylethyldiethoxysilane, 3,3,3-trifluoropropylmethyldichlorosilane, trimethylbutoxysilane, sym-diphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, hexamethyldisilazane, and bis{3-(triethoxysilyl) propyl}tetrasulfide. It is preferred that the organosilicon compound be hexamethyldisiloxane or dimethyldichlorosilane.

The amount of organosilicon compound added to the method is that sufficient to adequately hydrophobe the silica hydrogel to provide a hydrophobic silica gel which substantially retains its porosity during any subsequent drying, solvent exchange, and heating procedures. Generally the organosilicon compound should be added to the method in an amount such that there is at least about 0.04 organosilyl unit per $SiO_2$ unit in the silica hydrogel. The upper limit of the amount of organosilicon compound added to the process is not critical since any amount in excess of the amount required to saturate the silica gel will act as a solvent for the method.

During the conduct of step (A) it may be desirable to add a surfactant or water-miscible solvent to facilitate the reaction of the organosilicon compound with the silica hydrogel. The surfactant or water-miscible solvent may be added in the presence or absence of any water-immiscible organic solvent added to the method. Suitable surfactants can include, for example, anionic surfactants such as dodecylbenzene sulfonic acid, nonionic surfactants such as polyoxylene(23) lauryl ether and $(Me_3SiO)_2MeSi(CH_2)_3(OCH_2CH_2)_7OMe$ where Me is methyl, and cationic surfactants such as N-alkyltrimethyl ammonium chloride. Suitable water miscible solvents can include, for example, alcohols such as methanol, ethanol, propanol, n-butanol, and tetrahydrofuran. n-Propanol is a preferred water-miscible solvent for use in the present method.

The hydrophobic silica gel formed in step (A) may be treated in step (B) as is with no steps taken to reduce the water content. Alternatively, the hydrophobic silica gel may have a portion, substantially all, or all of the water removed by such methods as centrifugation or filtration and/or drying by the use of methods such as heating or reducing pressure or a combination of both heating and reducing pressure. By the term "substantially all" it is meant that the silica gel contain less than about 5 weight percent water.

The organic solvent can be added prior to, simultaneously with, or subsequent to the addition of the organosilicon compound. That is the silica hydrogel can be first converted into an organogel by replacement of the water with the organic solvent. On the other hand the organosilicon compound and the organic solvent can be added simultaneously to the silica hydrogel. Under these conditions the reaction of the silica hydrogel with the organosilicon compound and the replacement of the water in the silica hydrogel with the organic solvent may occur simultaneously. Finally the organosilicon compound can be added prior to the organic solvent, in which case the silica hydrogel reacts with the organosilicon compound and the resulting product is then converted into an organogel by an addition of an organic solvent. In the latter two cases the conversion to an organogel is accomplished by a phase separation in which the hydrophobic silica gel passes into the organic solvent phase.

A preferred method is where a water-immiscible organic solvent is added after formation of the hydrophobic silica hydrogel thereby effecting formation of a hydrophobic silica organogel and the solvent is thereafter removed from the hydrophobic silica organogel providing a substantially dry hydrophobic silica gel which is then treated in step (B) of the present method to form the hydrophilic silica gel.

For purpose of this invention any organic solvent immiscible with water can be employed. Suitable solvents include low molecular weight siloxanes such as hexamethyldisiloxane, octamethylcyclotetrasiloxane, diphenyltetramethyldisiloxane and trimethylsilyl endblocked dimethylpolysiloxane fluids. When a siloxane is employed as a solvent it may serve both as a solvent and as a reactant with the silica hydrogel. In addition, suitable solvents include aromatic hydrocarbons such as toluene and xylene; heptane and other aliphatic hydrocarbon solvents; cycloalkanes such as cyclohexane; ethers such as diethylether and dibutylether; halohydrocarbon such as methylene chloride, chloroform, ethylene chloride, and chlorobenzene; and ketones such as methylisobutylketone.

The amount of water-immiscible organic solvent is not critical so long as there is sufficient solvent to convert the silica hydrogel into a silica organogel. Preferably the solvent should have a boiling point below about 250° C. to facilitate its removal from the hydrophobic silica organogel, however the boiling point is not critical since the solvent may be removed from the hydrophobic silica organogel by centrifuging or other suitable means.

In step (B) of the present method the hydrophobic silica gel is heated in the presence of an oxidizing atmosphere at a temperature sufficient to reduce the hydrophobicity of the hydrophobic silica gel. By "oxidizing atmosphere" it is meant the presence of oxygen or oxygen source sufficient to reduce or prevent the formation of SiOC bonds during the heating process. In a preferred process the heating is effected in the presence of oxygen which may be supplied as a component of atmospheric air. Generally, the temperature can be any temperature that reduces the hydrophobicity of the hydrophobic silica gel without adversely effecting the structure of the gel. All or a portion of the hydrophobicity imparted to the silica gel by the treatment in step (A) may be reduced by the heating of step (B). Typically, a temperature within a range of about 300° C. to 1000 ° C. may be used, with a temperature within a range of about 400° C. to 800° C. being preferred. The method for heating the hydrophobic silica gel in step (B) is not critical and can be by means of a flame, induction furnace, and those type apparatuses typically used in commercial calcining operations of metal oxides.

Hydrophilic silica gels prepared by the present method can have a BET surface area within a range of about 100 $m^2/g$ to 1000 $m^2/g$ and a pore volume greater than about 2 ml/g. Preferred are those hydrophilic silica gels in which substantially all of the hydrophobicity imparted by the treatment in step (A) to the silica hydrogel is removed by the heat treatment of step (B), the hydrophilic silica gel has a BET surface area within a range of about 250 $m^2/g$ to 850 $m^2/g$, and the pore volume is within a range of about 2 ml/g to 5 ml/g.

The following examples are provided to illustrate the present invention. These examples are not intended to limit the scope of the present claims.

EXAMPLES

Samples 1–7 where prepared and characterized by the methods provided below and the physical properties are described in Tables 1 and 2.

Preparation of Hydrophobic Silica Gels

Sample 1. A silica hydrosol containing 0.1 g of $SiO_2$/ml was passed through a column filled with Dowex 50WX8-100 ion exchange resin in the acid form (The Dow Chemical Company, Midland, Mich.). The first approximately 800 ml of the silica hydrosol eluting from the column was discarded and the next 2L of deionized silica hydrosol collected. The 2L of deionized silica hydrosol was placed in a 5L flask and with rapid stirring 626 ml of concentrated HCl was added to the flask. A silica gel formed within a few minutes which was broken up by stirring. The flask content was heated at 100° C. for 3 hours and then cooled to 40° C. To the resulting suspension was added 872 ml of isopropyl alcohol and 112 ml of hexamethyldisiloxane. The flask content was stirred for 45 minutes at room temperature and then 2.4L of toluene were added to the flask. The flask content was stirred for 5 minutes, stirring stopped, and the flask content allowed to separate into an aqueous phase and a toluene phase. The aqueous phase was drained from the flask and the toluene phase was washed with 1L of deionized water. The flask was fitted with a Dean-Stark trap and the toluene phase refluxed to remove residual water. The toluene was evaporated and the hydrophobic silica gel further dried overnight at 150° C. The yield of the dried hydrophobic silica gel was 209.7 g.

Samples 2–5. Silica hydrosols containing 0.08 g $SiO_2$/ml were prepared by adding 400 ml of PQ N Clear Sodium Silicate (PQ Corporation, Valley Forge, Pa.) diluted with 960 ml of deionized water to a rapidly stirring solution of 136 ml of concentrated HCl in 504 ml of deionized water (pH=1.7). The pH of the resulting silica hydrosol was adjusted to pH 4 with a dilute solution of PQ N Clear Sodium Silicate (0.1 g $SiO_2$/ml) to form a silica hydrogel. Samples of the silica hydrogel where aged at room temperature for the following times: sample 2, 3.5 h; sample 3, 8 h; sample 4, 24 h; and sample 5, 96 h. After aging for the specified times each sample was treated as follows. 500 ml of concentrated HCl was added to the silica hydrogel sample followed by 833 ml of isopropyl alcohol and 227 ml of hexamethyldisiloxane. The resulting mixture was stirred at room temperature for 1 h and then 1.5L of toluene added to the sample along with stirring. Stirring was stopped and the sample allowed to separate into an aqueous phase and a toluene phase. The aqueous phase was discarded and 250 ml of isopropyl alcohol and 50 ml of deionized water added to the toluene phase. The sample was rapidly stirred for 2 minutes. Then 700 ml of deionized water were added to the sample with mixing and the sample again allowed to phase separate. The aqueous phase was discarded. The flask containing the sample was fitted with a Dean-Stark trap and the residual water removed by azeotropic distillation. The toluene phase was poured into glass pans and the toluene allowed to evaporate overnight. The remaining hydrophobic silica hydrogel was further dried at 150° C. for 14 hours.

Sample 6. An organosilicate-modified silica gel aged at pH 6.8, hydrophobed with hexamethyldisiloxane, and having incorporated therein FeCl3 as a heat stabilizing agent was prepared. A solution was prepared comprising 312 ml of PQ N Clear Sodium Silicate (PQ Corporation), 140 ml of sodium methyl silicate (DC® 722, Dow Corning Corporation, Midland, Mich.), and 948 ml of deionized water. This solution was added to a rapidly stirred solution comprising 300 ml of concentrated HCl diluted with 300 ml of deionized water to form an organosilicate modified silica hydrosol comprising 0.063 g of $SiO_2$/ml and 0.017 g of $MeSiO_{3/2}$/ml (Me represents a methyl group). After stirring for an additional 2 to 3 minutes, the organosilicate-modified silica hydrosol was poured into flat pans and allowed to gel for about 2.5 hours. The organosilicate-modified silica hydrogel was cut into 2.5 cm squares and washed with deionized water until the pH of the effluent was between pH 3 and pH 4. The washed organosilicate-modified silica hydrogel was placed in a glass container, adjusted to about pH 6.8 by the addition of concentrated ammonium hydroxide, and the resulting mixture aged 44 hours at room temperature.

After aging, the water phase was drained from the organosilicate-modified silica gel and the silica hydrogel placed in a 5L glass flask. To the organosilicate-modified silica hydrogel, with stirring, was added 727 ml of concentrated HCl, 909 ml of isopropanol, 471 ml of hexamethyldisiloxane, and 4.2 g of $FeCl_3$. After stirring the flask content 1 hour at room temperature, 2L of toluene were added. After stirring the flask content for an additional 2 to 3 minutes, stirring was stopped and the aqueous phase drained from the flask. The toluene phase was washed with 1L of deionized water. The flask was fitted with a Dean-Stark trap and the toluene phase refluxed to remove residual water. The toluene phase was evaporated under reduced pressure leaving as product a hydrophobic organosilicate-modified silica gel. The organosilicate-modified hydrophobic silica gel was dried for 14 hours at 150° C. The yield of dried hydrophobic organosilicate-modified silica gel was 171 g.

Sample 7. An organosilicate-modified silica gel aged at pH 6.8, hydrophobed with dimethyldichlorosilane, and having incorporated therein $FeCl_3$ as a heat stabilizing agent was prepared. A solution was prepared comprising 312 ml of PQ N Clear Sodium Silicate (PQ Corporation), 140 ml of sodium methyl silicate (DC 722) and 948 ml of deionized water. This solution was added to a rapidly stirred solution comprising 300 ml of concentrated HCl diluted with 300 ml of deionized water to form an organosilicate-modified silica hydrosol comprising 0.063 g of $SiO_2$/ml and 0.017 g of $MeSiO_{3/2}$/ml. After stirring for an additional 2 to 3 minutes, the organosilicate-modified silica hydrosol was poured into flat pans and allowed to gel for about 2 hours. The organosilicate-modified silica hydrogel was cut into 2.5 cm squares and washed with deionized water until the pH of the effluent was between pH 3 and pH 4. The washed organosilicate-modified silica hydrogel was placed in a glass container, adjusted to about pH 6.8 by the addition of concentrated ammonium hydroxide, and the resulting mixture aged 44 hours at room temperature.

After aging, the water phase was drained from the organosilicate-modified silica gel and the silica hydrogel placed in a 5L glass flask. To the organosilicate-modified silica hydrogel, with stirring, was added 727 ml of concentrated HCl, 909 ml of isopropanol, 130 ml of dimethyldichlorosilane, and 4.2 g of $FeCl_3$. After stirring the flask content 1 hour at room temperature, 2L of toluene were added to the flask. After stirring the flask content for an additional 2 to 3 minutes, stirring was stopped and the aqueous phase drained from the flask. The toluene phase was washed with 1L of deionized water. The flask was fitted with a Dean-Stark trap and the toluene phase refluxed to remove residual water. The toluene phase was evaporated under reduced pressure leaving as product a hydrophobic organosilicate-modified silica gel. The hydrophobic organosilicate-modified silica gel was dried 14 hours at 150° C. The yield of dried hydrophobic organosilicate-modified silica gel was 179 g.

Characterization of Silica Gels

The above described hydrophobic organosilicate-modified silica gels were a characterized as to BET surface area, pore volume, pore diameter, and hydrophilicity before and after being heated in a Cone Calorimeter at 50 kW/m$^2$ and the results are provided in Table 1. The BET surface area was determined by the Brunauer Emmett and Teller (BET) method, supra; pore volume and pore diameter were determined by Barrett-Joyner-Hglenda (BJH) analysis; and hydrophobicity was determined visually by observing the extent the silica gel wetted when contacted with water, where "−" indicates poor wettability, a "±" indicates partial wettability, and a "+" indicates good wettability.

TABLE 1

Physical Properties of Silica Gels Before and After Heating in Cone Calorimeter

| Sample No. | BET Area (m$^2$/g) | | Pore Vol. (ml/g) | | Pore Dia. (nm) | | Wetting | |
|---|---|---|---|---|---|---|---|---|
| | Before | After | Before | After | Before | After | Before | After |
| 1 | 529 | 604 | 2.98 | 3.57 | 144 | 189 | − | + |
| 2 | 839 | 435 | 2.29 | 2.58 | 75 | 160 | − | ± |
| 3 | 860 | 789 | 3.10 | 2.81 | 95 | 94 | − | ± |
| 4 | 835 | 591 | 3.06 | 2.85 | 100 | 102 | − | ± |
| 5 | 734 | 670 | 3.08 | 2.73 | 105 | 112 | − | ± |
| 6 | 622 | 568 | 3.12 | 4.00 | 148 | 236 | − | ± |
| 7 | 428 | 528 | 2.93 | 2.48 | 185 | 165 | − | ± |

A portion of samples 1, 3, and 5 where heated in a muffle furnace at a ramp temperature of 2° C. per minute up to 650° C. and physical characteristic determined as described above. The results are provided in Table 2.

TABLE 2

Physical Properties of Silica Gels Before and After Heating in Muffle Furnace

| Sample No. | BET Area (m$^2$/g) | | Pore Vol. (ml/g) | | Pore Dia. (nm) | | Wetting | |
|---|---|---|---|---|---|---|---|---|
| | Before | After | Before | After | Before | After | Before | After |
| 1 | 529 | 664 | 2.98 | 3.53 | 144 | 185 | − | + |
| 3 | 860 | 733 | 3.10 | 2.33 | 95 | 102 | − | + |
| 5 | 734 | 735 | 3.08 | 2.52 | 105 | 111 | − | + |

We claim:

1. A method for preparing a hydrophilic silica gel comprising heating a hydrophobic silica hydrogel having organic substituents bonded thereto in an oxidizing atmosphere at a temperature sufficient to reducing the hydrophobicity of the hydrophobic silica hydrogel by oxidation of the organic substituents.

2. A method for preparing a hydrophilic silica gel comprising
(A) contacting a silica hydrogel with (1) a catalytic amount of a strong acid; (2) an organosilicon compound selected from the group consisting of organosilanes described by formula $$R^1{}_aH_bSiX_{4-a-b}$$

organosiloxanes described by formula $$R^1{}_nSiO_{(4-n)/2}, \text{ and}$$

organodisilazanes described by formula $$(R^1{}_3Si)_2NH,$$

where each $R^1$ is independently selected from the group consisting of hydrocarbon radicals comprising about 1 to 12 carbon atoms and organofunctional hydrocarbon radicals comprising about 1 to 12 carbon atoms, each X is independently selected from the group consisting of halogen and alkoxy radicals comprising 1 to 12 carbon atoms, a=0, 1, 2, or 3, b=0 or 1, a+b=1, 2, or 3 with the proviso that when b=1 then a+b=2 or 3, n is an integer of from 2 to 3 inclusive thereby forming a hydrophobic silica hydrogel and
(B) heating the hydrophobic silica hydrogel in an oxidizing atmosphere at a temperature sufficient to reduce the hydrophobicity of the hydrophobic silica hydrogel thereby forming a hydrophilic silica gel.

3. A method for preparing a hydrophilic silica gel comprising
(A) contacting a silica hydrogel with (1) a catalytic amount of a strong acid; (2) an organosilicon compound selected from the group consisting of organosilanes described by formula $$R^1{}_aH_bSiX_{4-a-b}$$

organosiloxanes described by formula $$R^1{}_nSiO_{(4-n)/2}, \text{ and}$$

organodisilazanes described by formula $$(R^1{}_3Si)_2NH,$$

where each $R^1$ is independently selected from the group consisting of hydrocarbon radicals comprising about 1 to 12 carbon atoms and organofunctional hydrocarbon radicals comprising about 1 to 12 carbon atoms, each X is independently selected from the group consisting of halogen and alkoxy radicals comprising 1 to 12 carbon atoms, a=0, 1, 2, or 3, b=0 or 1, a+b=1, 2, or 3 with the proviso that when b=1 then a+b=2 or 3, n is an integer of from 2 to 3 inclusive thereby forming a hydrophobic silica hydrogel,
(B) removing substantially all of the water from the hydrophobic silica hydrogel thereby forming a hydrophobic silica gel, and
(C) heating the hydrophobic silica gel in an oxidizing atmosphere at a temperature sufficient to reduce the hydrophobicity of the hydrophobic silica gel thereby forming a hydrophilic silica gel.

4. A method for preparing a hydrophilic silica gel comprising
(A) contacting a silica hydrogel with (1) a catalytic amount of a strong acid; (2) an organosilicon compound selected from the group consisting of organosilanes described by formula $$R^1{}_aH_bSiX_{4-a-b}$$

organosiloxanes described by formula $$R^1{}_nSiO_{(4-n)/2}, \text{ and}$$

organodisilazanes described by formula $$(R^1{}_3Si)_2NH,$$

where each $R^1$ is independently selected from the group consisting of hydrocarbon radicals comprising about 1 to 12 carbon atoms and organofunctional hydrocarbon radicals comprising about 1 to 12 carbon atoms, each X is independently selected from the group consisting of halogen and alkoxy radicals comprising 1 to 12 carbon atoms, a=0, 1, 2, or 3, b=0 or 1, a+b=1, 2, or 3 with the proviso that when b=1 then a+b=2 or 3, n is an integer of from 2 to 3 inclusive thereby forming a hydrophobic silica hydrogel,
(B) contacting the hydrophobic silica hydrogel with a water immiscible organic solvent in sufficient amount to convert the hydrophobic silica hydrogel to a hydrophobic silica organogel, and
(C) heating the hydrophobic silica organogel in an oxidizing atmosphere at a temperature sufficient to reduce the hydrophobicity of the hydrophobic silica organogel thereby forming a hydrophilic silica gel.

5. A method for preparing a hydrophilic silica gel comprising
(A) contacting a silica hydrogel with (1) a catalytic amount of a strong acid; (2) an organosilicon compound selected from the group consisting of organosilanes described by formula $$R^1{}_aH_bSiX_{4-a-b}$$

organosiloxanes described by formula $$R^1{}_nSiO_{(4-n)/2}, \text{ and}$$

organodisilazanes described by formula $$(R^1{}_3Si)_2NH,$$

where each $R^1$ is independently selected from the group consisting of hydrocarbon radicals comprising about 1 to 12 carbon atoms and organofunctional hydrocarbon radicals comprising about 1 to 12 carbon atoms, each X is independently selected from the group consisting of halogen and alkoxy radicals comprising 1 to 12 carbon atoms, a=0, 1, 2, or 3, b=0 or 1, a+b=1, 2, or 3 with the proviso that when b=1 then a+b=2 or 3, n is an integer of from 2 to 3 inclusive thereby forming a hydrophobic silica hydrogel,
(B) contacting the hydrophobic silica hydrogel with a water immiscible organic solvent in sufficient amount to convert the hydrophobic silica hydrogel to a hydrophobic silica organogel, and (C) removing substantially all of the solvent from the hydrophobic silica organogel to form a hydrophobic silica gel and (D) heating the hydrophobic silica gel in an oxidizing atmosphere at a temperature sufficient to reduce the hydrophobicity of the hydrophobic silica gel thereby forming a hydrophilic silica gel.

6. A method according to claim 2, where the hydrophobic silica has a surface area in the dry state within a range of about 100 m$^2$/g to 1000 m$^2$/g.

7. A method according to claim 2, where the silica hydrogel is aged prior to step (A) at a temperature of about 75° C. to 150° C. for a time period within a range of about 30 minutes to 20 hours.

8. A method according to claim 2, where the organosilicon compound is selected from the group consisting of hexamethyldisiloxane and dimethyldichlorosilane.

9. A method according to claim 2, where the heating of Step (B) is conducted at a temperature within a range of about 300° C. to 1000° C.

10. A method according to claim 2, where the heating of Step (B) is conducted at a temperature within a range of about 400° C. to 800° C.

11. A method according to claim 3, where the hydrophobic silica has a surface area in the dry state within a range of about 100 m$^2$/g to 1000 m$^2$/g.

12. A method according to claim 3, where the silica hydrogel is aged prior to step (A) at a temperature of about 75° C. to 150° C. for a time period within a range of about 30 minutes to 20 hours.

13. A method according to claim 3, where the organosilicon compound is selected from the group consisting of hexamethyldisiloxane and dimethyldichlorosilane.

14. A method according to claim 3, where the heating of Step (C) is conducted at a temperature within a range of about 300° C. to 1000° C.

15. A method according to claim 2, where the heating of Step (B) is conducted at a temperature within a range of about 400° C. to 800° C.

16. A method according to claim 4, where the hydrophobic silica has a surface area in the dry state within a range of about 100 m$^2$/g to 1000 m$^2$/g.

17. A method according to claim 4, where the silica hydrogel is aged prior to step (A) at a temperature of about 75° C. to 150° C. for a time period within a range of about 30 minutes to 20 hours.

18. A method according to claim 4, where the organosilicon compound is selected from the group consisting of hexamethyldisiloxane and dimethyldichlorosilane.

19. A method according to claim 4, where the heating of Step (C) is conducted at a temperature within a range of about 300° C. to 1000° C.

20. A method according to claim 4, where the heating of Step (C) is conducted at a temperature within a range of about 400° C. to 800° C.

21. A method according to claim 5, where the heating of Step (C) is conducted at a temperature within a range of about 400° C. to 800° C.

22. A method according to claim 5, where the hydrophobic silica has a surface area in the dry state within a range of about 100 m$^2$/g to 1000 m$^2$/g.

23. A method according to claim 5, where the silica hydrogel is aged prior to step (A) at a temperature of about 75° C. to 150° C. for a time period within a range of about 30 minutes to 20 hours.

24. A method according to claim 5, where the organosilicon compound is selected from the group consisting of hexamethyldisiloxane and dimethyldichlorosilane.

25. A method according to claim 5, where the heating of Step (D) is conducted at a temperature within a range of about 300° C. to 1000° C.

26. A method according to claim 5, where the heating of Step (D) is conducted at a temperature within a range of about 400° C. to 800° C.

27. A method according to claim 1, where the heating is conducted at a temperature within a range of about 300° C. to 1000° C.

* * * * *